Oct. 13, 1970    B. I. BARNES    3,533,217
CARTON FLAP SEALING MACHINE
Original Filed Jan. 31, 1969    4 Sheets-Sheet 4
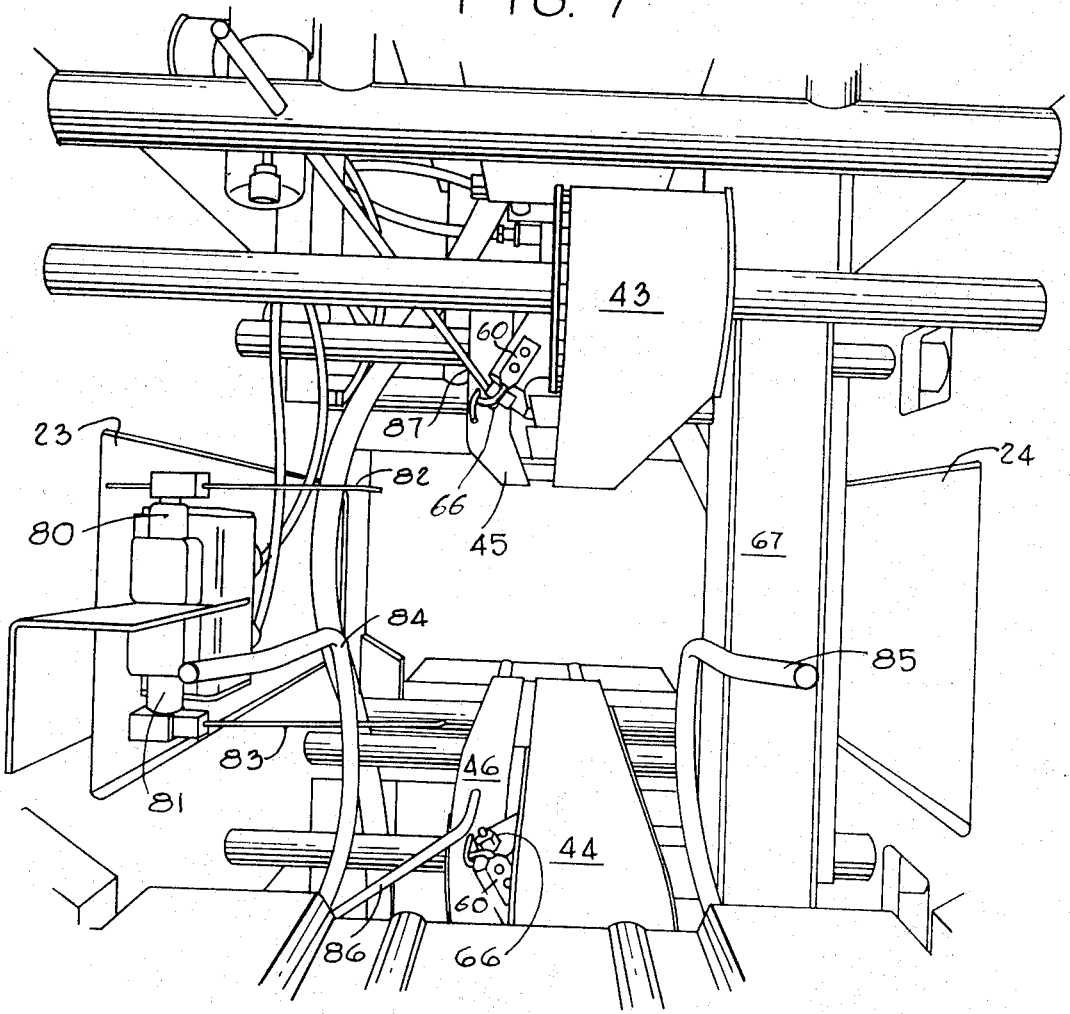
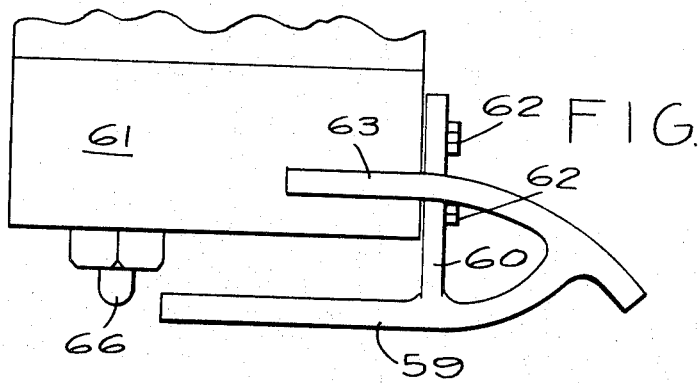
INVENTOR.
BAYARD I. BARNES
BY
Walter M. Rodgers
ATTORNEY

United States Patent Office 3,533,217
Patented Oct. 13, 1970

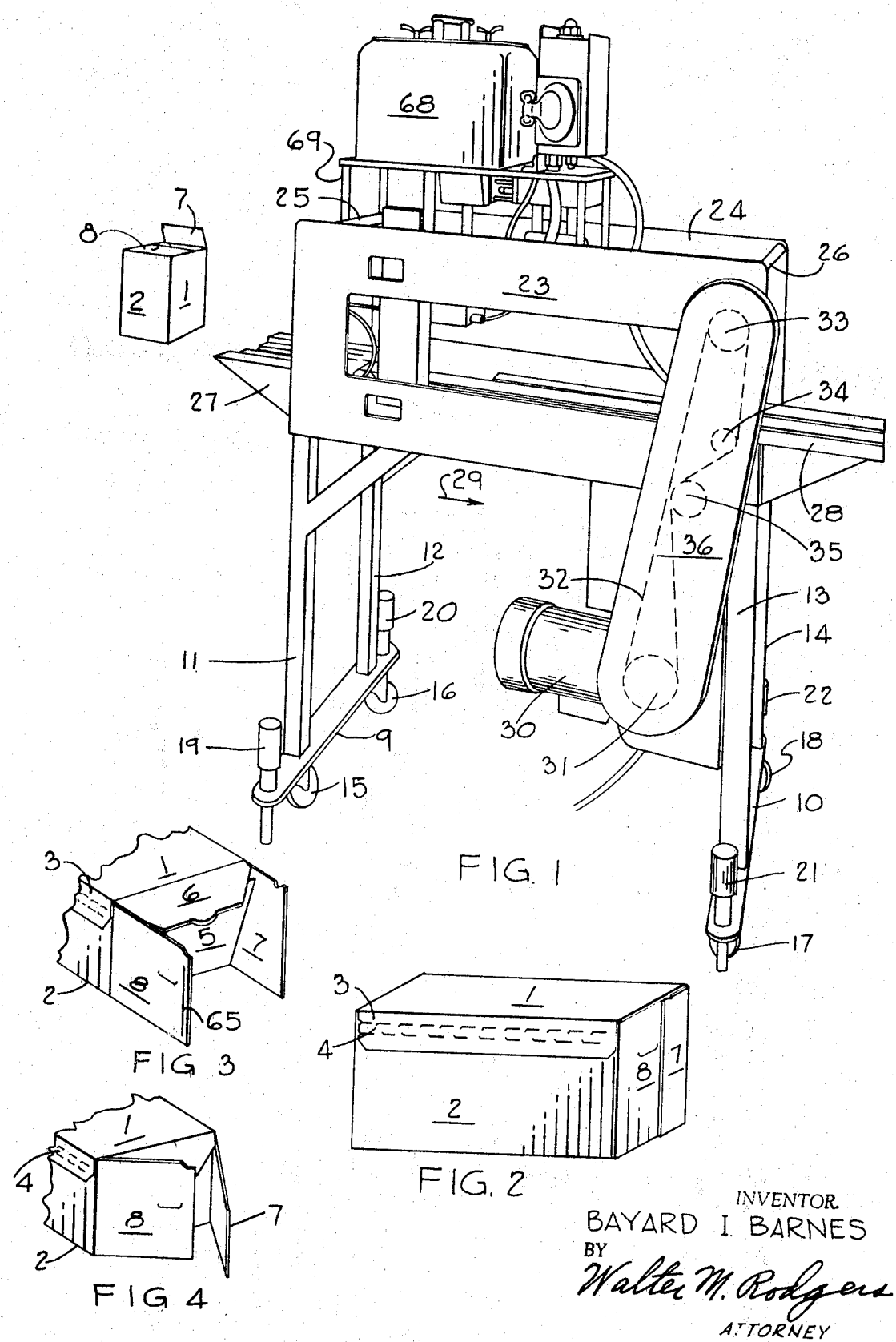

3,533,217
CARTON FLAP SEALING MACHINE
Bayard I. Barnes, Oakland, Calif., assignor to The Mead Corporation, a corporation of Ohio
Original application Jan. 31, 1969, Ser. No. 798,252. Divided and this application June 2, 1969, Ser. No. 843,263
Int. Cl. B65b 7/20
U.S. Cl. 53—374                          6 Claims

ABSTRACT OF THE DISCLOSURE

The machine and method of this invention are utilized to seal the end flaps of a carton such as an ice cream carton. The filled carton is fed onto the entry platform of the machine with the carton resting on one end and with the other end open. The end flaps are in closed but not sealed condition. The carton is moved onto a longitudinally disposed feeder mechanism comprising an upper and lower feeder conveyor, the feed reaches of the feeder conveyors being disposed in parallel relationship and being arranged to move in the same direction. The wider exterior end flap of the carton is in close secure contact with the working reaches of the feeder conveyor and by this means the carton is fed through the machine from one end to the other in a predetermined orientation. Suitable guides disposed alongside the feeder conveyor hold one of the panels to be sealed in spaced relation from the other panel and a glue injector is disposed to apply glue along an edge of the inner one of the panels to be overlapped and glued. Following the application of glue at both ends of the carton, suitable guides fold the outer ones of the panels to be secured together into close face contacting relation with the inner ones of the end panels to be sealed at each end of the carton. Thereafter the outer end panel at each end of the carton is engaged by presser conveyors whose working reaches are disposed alongside the feeder reaches of the feeder conveyors. Suitable back-up plates are mounted immediately adjacent the working reaches of the flexible feeder and presser conveyors and all the conveyors operate in synchronism so that the panels to be secured together are firmly pressed into engagement with each other by the presser conveyors as the carton moves through the machine, the sealing force being exerted directly through the associated presser conveyor.

This application is a division of application Ser. No. 798,252, filed Jan. 31, 1969, now abandoned.

Summary of the invention

The invention as embodied in a machine for sealing overlapping panels of a carton comprises a pair of feeder conveyors having their working reaches disposed in spaced substantially parallel relation, a pair of presser conveyors having their working reaches disposed alongside of and in substantially the same plane as the working reaches of the feeder conveyors respectively, driving means for operating all of the conveyors in synchronism so that the working reaches of all conveyors move at the same velocity and in the same direction, the presser conveyors being somewhat shorter than the feeder conveyors and the entry ends of the presser conveyors being spaced from the entry ends of the feeder conveyors in the direction of movement of the working reaches thereof, and conditioning means disposed alongside the feeder conveyor and adjacent the entry end of the presser conveyor for preparing the carton panels to be secured together for subsequent sealing by pressure applied thereto by the presser conveyors. According to a feature of the invention, the panels to be sealed are held in spaced relation by suitable guide means while being conditioned by the conditioning means and preferably means responsive to movement of a particular carton is utilized to initiate operation of the conditioning means. According to another feature of the invention synchronous movement of the various conveyors is achieved by suitable driving cogs and by projections which cooperate therewith and which are formed on the inner surfaces of the conveyors. In addition back-up means for the conveyors are provided so as to insure the application of adequate feeding and sealing pressure to the cartons. An essential feature of the method of this invention reside in the fact that the conditioning substance is applied along a straight line and in the same direction as movement of the carton and the orientation of the carton is maintained in a fixed relationship to the conditioning means during the application of the conditioning substance and during the sealing operation.

Figure 5:
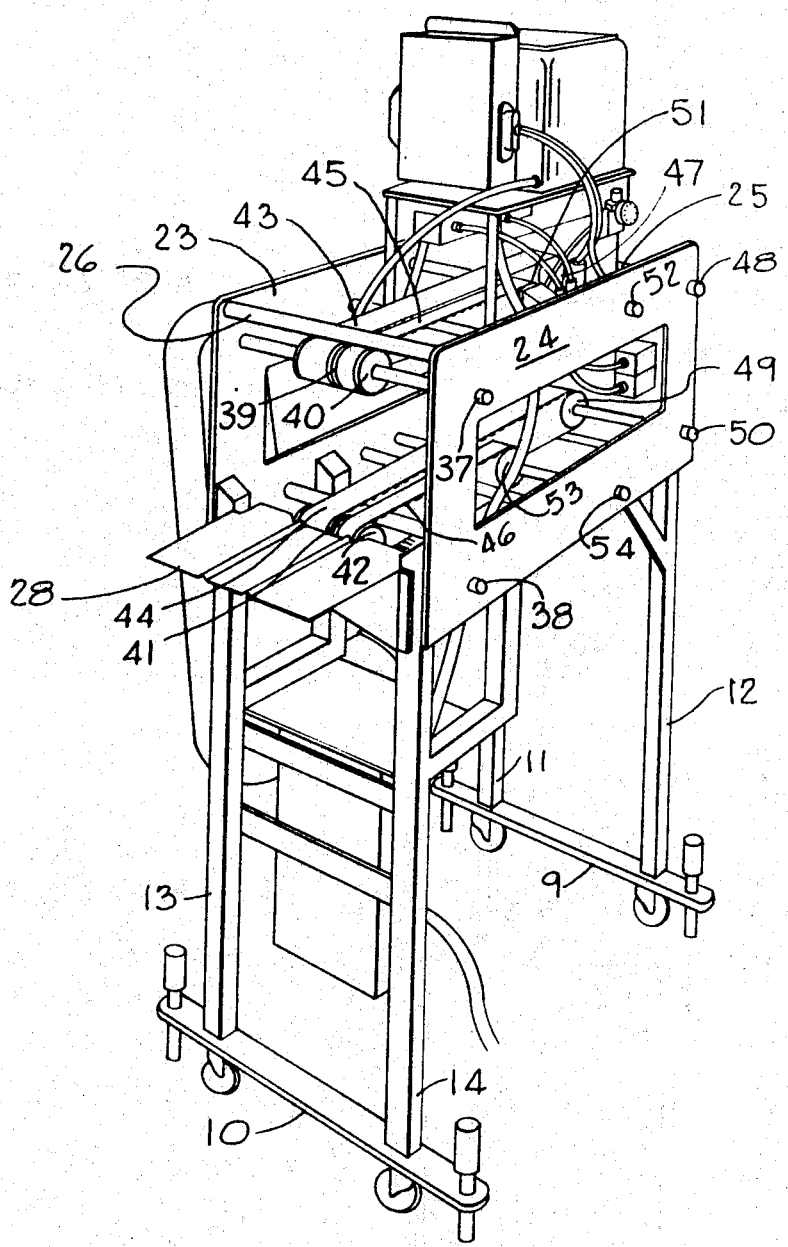
Figure 6:
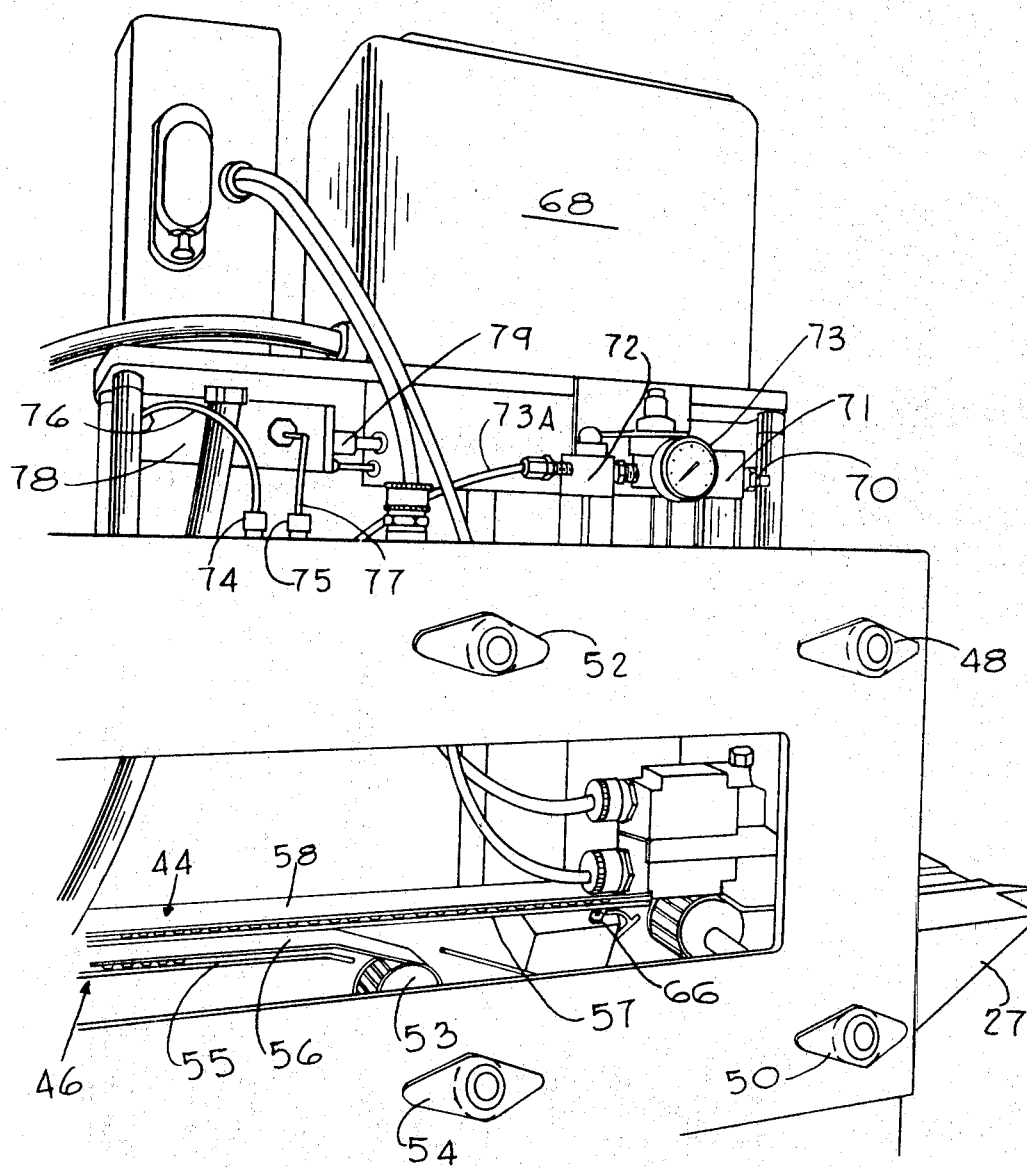

For a better understanding of the invention reference may be had to the following detailed description taken in conjunction with the accompanying drawings in which FIG. 1 is a perspective view of a machine constructed according to the invention; FIG. 2 is a perspective view of a set-up and sealed carton which results from the sealing action of the machine depicted in FIG. 1; FIGS. 3 and 4 show sequential stages in the folding of the end panels of the carton depicted in FIG. 2; FIG. 5 is a perspective view of the machine depicted in FIG. 1 but taken from a vantage point generally opposite to that from which FIG. 1 is taken; FIG. 6 is an enlarged view of a portion of the machine taken from a vantage point similar to that from which FIG. 5 is taken; FIG. 7 is a perspective view of the right hand end of the machine depicted in FIGS. 5 and 6 and in which FIG. 8 is a fragmentary greatly enlarged view of a portion of the machine depicted in FIG. 6.

The set-up and sealed carton as depicted in FIG. 2 comprises a lid panel 1, a front panel 2, as well as bottom and rear panels not observable in FIGS. 2, 3 and 4. Lid panel 1 is secured to front panel 2 by a lid front panel 3 which is secured by known means to the outer surface of front panel 2. Preferably a tear strip 4 is formed in lid front panel 3 in known manner.

The ends of the carton constitute end panels which are overlapped in a desired sequence, preferably the flaps at one end being substantially identical to those at the other end. As shown in FIGS. 2, 3 and 4 bottom end panel 5 is foldably joined to the bottom panel while top end panel 6 is foldably joined to the lid panel 1. Furthermore rear end panel 7 is foldably joined to the rear panel of the carton and a front end panel 8 is foldably joined to the front panel 2.

In order to close the ends of the carton, the bottom end panel 5 is first folded into closed position and the lid end panel 6 is then folded down in overlapping relationship therewith as best shown in FIG. 3. Following this folding operation, front end panel 8 is folded into flat face contacting relation with panels 5 and 6 and rear end panel 7 is subsequently folded into overlapping relationship with front end panel 8 as best shown in FIG. 2.

As explained, the machine and method of this invention constitute means whereby the panels 7 and 8 are secured to each other preferably as by an application of glue to the outer edge of panel 8 following which the inner surface of panel 7 is pressed into firm contact with the overlapped edge of panel 8 so as to secure these panels together.

The machine as shown in the drawing comprises a pair of horizontal base elements 9 and 10 to which are secured vertically disposed support elements 11, 12, 13 and 14. Preferably suitable rollers 15, 16, 17 and 18 are mounted in known manner to the base elements 9 and 10 so as to facilitate movement of the machine from place to place.

In order to afford a steady and level support for the machine, a plurality of support pedestals 19, 20, 21 and 22 are adjustably mounted on the ends of base elements 9 and 10 in known manner and simply engage the floor or other supporting platform for the machine once the location thereof is determined.

Of course it will be understood that suitable transversely disposed frame structure is affixed to the upper ends of support elements 11, 12, 13 and 14 and a pair of spaced parallel support plates 23 and 24 are secured to the frame structure and braced in spaced relation by suitable bolts and spacer elements generally designated by the numerals 25 and 26.

For receiving filled packages to be sealed, an entry platform is fixed to one end of the machine and a delivery platform 28 is disposed at the other end of the machine for accommodating sealed cartons after their passage through the machine. Thus the machine as depicted in FIG. 1 is arranged so that the cartons to be sealed enter from the left hand side and move toward the right as indicated by the directional arrow designated by the numeral 29.

Driving means for operating the movable parts of the machine may comprise an electric motor 30, a sprocket 31 driven by suitable interconnecting means from the motor 30, an endless chain 32, a pair of driven sprockets 33 and 35 together with an idler sprocket 34. All the sprockets and their associated chain preferably are housed within a protective cover 36.

As is apparent from FIGS. 1 and 5, transversely disposed shafts 37 and 38 are affixed to and rotatable with the driven sprockets 33 and 35. A pair of driving cogs 39 and 40 are affixed to and rotatable with the shaft 37 and a similar pair of driving cogs 41 and 42 are affixed to and rotatable with the driving shaft 38. Disposed about and driven by the driving cogs 39 and 41 are a pair of feeder conveyors 43 and 44 respectively. Preferably these feeder conveyors are provided with inner projections which correspond to the spaces between the teeth of the cogs 40 and 41 so that the feeder conveyors 43 and 44 are driven in synchronism with each other and with their working reaches moving in the same direction.

In like fashion, the presser conveyors 45 and 46 are provided with inner projections which mesh with the teeth of cogs 40 and 42 so that presser conveyors 45 and 46 move in synchronism with the feeder conveyors 43 and 44 and furthermore the working reaches of presser conveyors 45 and 46 move in the same direction.

Of course the driving shafts 37 and 38 and their associated cogs are disposed at the delivery ends of the feeder and presser conveyors. These conveyors are mounted on idler cogs at their entry ends. Thus the entry end of feeder conveyor 43 is rotatable about idler cog 47 disposed on shaft 48 secured at its ends to spaced support plates 23 and 24. Similarly the entry end of feeder conveyor 44 is rotatable about idler cog 49 mounted on shaft 50 supported by support plates 23 and 24 and its ends. In like fashion presser conveyor 45 is mounted at its entry end on idler cog 51 which is disposed on shaft 52 supported at its ends by support plates 23 and 24 while the entry end of feeder conveyor 46 is mounted on idler cog 53 supported by shaft 54 which in turn is mounted at its ends to support plates 23 and 24.

For the purpose of supporting the working reaches of both the feeder conveyors and of both the presser conveyors, suitable back-up plates are provided. For instance and as best shown in FIG. 6 a back-up plate 55 is disposed underneath the working reach 56 of the presser conveyor 46. Similarly a back-up plate 57 is disposed underneath the working reach 58 of feeder conveyor 44. The infeed ends of the back-up plates are bevelled in a direction away from the working reaches of their associated conveyors respectively to facilitate sliding cooperation therebetween and to prevent undesired collision and interference between the infeed ends of the back-up plates and the projections on said conveyors.

The filled carton enters the platform 27 while oriented as depicted in FIG. 1, i.e., with the lid panel 1 adjacent the entry end of the machine and with the front panel 2 adjacent to and observable by the viewer. Of course the lower end panel 8 is arranged to ride onto the working reach 58 of the feeder conveyor 44.

For the purpose of holding the end panels 7 and 8 in spaced relation while an application of glue is made to the portion of panel 8 to be overlapped, a positioning guide generally depicted in FIG. 8 is utilized at both ends of the carton. Thus as is best shown in FIG. 8, a fixed curved guide 59 rides above the upper flap 8 and holds that flap into secure face contacting relation with the upper end of the carton, the movement of the carton in FIG. 8 being from right to left. Guide 59 is secured by a stud 60 to a part of the frame structure 61 by suitable means such as bolts 62. In like fashion guide 63 is arranged to engage the inner surface of panel 7 and to hold that panel upwardly in spaced relation to the panel 8. Guide 63 is integral with guide 59. Of course a structure such as the guides 59 and 63 is also disposed to ride on the bottom ones of the panels 7 and 8.

With the panel 7 hold outwardly in spaced relation relative to panel 8, an application of glue is made to the outer surface of an edge of panel 8 as indicated in FIG. 3 by the numeral 65. This application of glue is made by a glue injector 66 one of which is mounted to cooperate with the lower flap 8 and the other of which is arranged to apply glue to the upper flap 8 as is best seen in FIG. 7.

Glue is supplied to nozzle 66 from a C frame generally designated in the drawings by the numeral 67. Glue is supplied to heated frame 67 from a glue reservoir 68 disposed on suitable mounting structure 69 atop the frame plates 23 and 24. The glue reservoir 68 is not under pressure but the glue supplied through nozzle 66 is subjected to suitable operating pressure by apparatus now to be described.

As is best shown in FIG. 6, an inlet connection 70 is arranged to be connected to a suitable source of pressure such as an air reservoir. Air from inlet 70 is fed through a suitable water receptacle 71 of conventional construction and through a conventional oil injector 72. Gauge 73 is arranged to afford a visual indication of the magnitude of the pressure supplied to the mechanism through inlet 70. Air pressure is applied from oil injector 72 through air line 73A to a pair of solenoid controlled valves 74 and 75 to which lines 76 and 77 are connected respectively. Lines 76 and 77 are connected to opposite ends of air motor 78 which is provided with a reciprocable plunger 79. Air motor 78 and plunger 79 together with the solenoid valves 74 and 75 are of conventional construction. Plunger 79 is connected at its right-hand end to a piston not shown in the drawing which in turn imparts pressure to the C structure 67 whereby pressure is intermittently applied to the nozzles 66. A conventional check valve (not shown) is interconnected between glue reservoir 68 and C structure 67 so that as the plunger 79 is moved toward the right due to pressure in line 76, pressure is imparted by the piston controlled plunger 79 to the C head but due to the action of the check valve pressure is not supplied to the glue reservoir 68.

Control of solenoid valves 74 and 75 is by means of a pair of micro switches 80 and 81 mounted on support plate 23. The micro switches 80 and 81 are provided with feeler fingers 82 and 83 respectively. The micro switches 80 and 81 are independently adjustable and one feeler finger such as 82 is arranged to be engaged by the carton to be sealed in sequence ahead of engagement of the feeler finger 83. Furthermore, micro switches 80 and 81 are arranged in series so that both switches must be closed in order to actuate solenoid valve 74 and thus to impart a charge of glue through nozzles 66 to both ends of the carton being sealed. After the sealing operation is completed, the carton passes through the machine under the control of feeder belts 43 and 44 and pressure is then applied by presser belts 45 and 46 to the flaps 7 at both ends of the carton. Once a carton clears one feeler finger such as 82 the circuit is then interrupted to value 74 whereupon the solenoid controlled valve 74 closes and pressure from line 73 through valve 75 is imparted to the right hand end of air motor 78 so as to withdraw the plunger 79 toward the left. This withdrawal action draws a charge of glue from reservoir 68 down into the upper portion of C head 67 so as to condition the apparatus for a subsequent application of glue to the succeeding carton.

For the purpose of guiding the cartons into the entry end of the machine, a pair of guides 84 and 85 are arranged on either side of the machine as best shown in FIG. 7. Guide 85 engages front wall 2 of the carton while guide 84 engages the back wall thereof.

After the glue injecting operation is completed, the panels 7 at both ends of the carton are folded into flat face contacting relation with their associated panels 8 by suitable guides 86 and 87 which are disposed at the bottom and top of the carton respectively. As the panels 7 leave the guides 86 and 87 these panels ride between the working reaches of the pressure conveyors 45 and 46. Since the working reaches of the feeder and presser conveyors are provided with back-up plates, it is apparent that panels 7 are forced firmly into contact with the overlapped portion of the associated panel 8 by the presser conveyor. Once a sealing operation is complete, the carton is passed over onto the delivery platform 28.

The invention as described above utilizes glue injectors such as 66. It will be understood, that the invention is also applicable to an arrangement wherein a heat sealable substance is pre-applied to the portions of panels 7 and 8 or to one of the panels to be overlapped. Under these circumstances a heat applying device could be substituted for the nozzles 66 and in the claims the term "conditioning means" is used to contemplate both arrangements.

While a particular embodiment of the invention has been shown and described, the invention is not limited thereto and it is intended in the appended claims to cover all such changes and modifications as fall within the true spirit and scope of the invention.

The embodiments of the invention in which an exclusive property or privilege is claimed are defined as follows:

1. A machine for sealing face contacting panels of a carton, said machine comprising a pair of feeder conveyors having their working reaches disposed in spaced substantially parallel relation, driving means for imparting operating movement to said feeder conveyors so that their working reaches move in synchronism with each other and in the same direction, a pair of presser conveyors having their working reaches disposed alongside of and being movable in the same direction as the working reaches of said feeder conveyors respectively, said presser conveyors being operably connected with said driving means so as to move in coordination with movement of said feeder conveyors, the entry ends of said presser conveyors being spaced from the entry ends of said presser conveyors in the direction of movement of the working reaches of said conveyors, and conditioning means disposed alongside said feeder conveyor and near the entry end thereof for preparing the carton panels for subsequent sealing by pressure applied thereto by said presser conveyors.

2. A machine according to claim 1 wherein said conditioning means comprises a positioning guide for holding the carton panels in spaced relation to each other, and means for applying a sealing substance to one panel while the positions of the panels relative to each other are determined by said positioning guide.

3. A machine according to claim 1 wherein said conveyors are movably mounted on toothed cogs and wherein the inner surfaces of said conveyors are provided with projections which are spaced to cooperate with the teeth of said cogs whereby synchronous movement is imparted to said conveyors and wherein the outer surfaces of said conveyors are of smooth configuration.

4. A machine according to claim 1 wherein back-up means are disposed adjacent the working reaches of both of said conveyors, the back-up means for each conveyor being spaced apart by a distance such that adequate gripping action is applied to the carton disposed therebetween by the feeder conveyor and so that adequate sealing pressure is applied to the carton panels to be sealed by the presser conveyor.

5. A machine according to claim 4 wherein said back-up means comprises a fixed plate disposed in flat face contacting relation to the working reach of each of said conveyors and wherein the ends of said plates are bevelled in a direction away from the adjacent conveyor working reach and generally toward the return reach thereof.

6. A machine for sealing a pair of panels of a carton in face contacting relation to form a closed wall of the carton, said machine comprising a paid of endless conveyors having straight parallel working reaches oppositely disposed in facing parallel relation to each other and spaced to receive therebetween and to engage opposed walls of the carton so as to apply sealing pressure to said face contacting panels and each conveyor being movably mounted on a pair of toothed cogs, a common driving means coupled with corresponding cogs of each pair of cogs, a plurality of spaced projections formed on the inner surfaces of each of said conveyors and arranged to cooperate with the teeth of said cogs whereby synchronous movement is imparted to said conveyors, a fixed back-up plate disposed in close proximity to the inner surface of each of said conveyors and having a straight portion extending along and in parallel face contacting relation to at least a substantial part of the working reach of each conveyor, said back-up plates being in sliding contact with their associated conveyors and being effective to impart a panel sealing force directly through said conveyors respectively to the panels to be sealed, means at the infeed end of said conveyors for conditioning at least one of said panels for subsequent sealing by said conveyors and said back-up plates, and carton conveying means extending parallel to said conveyors for moving the carbon past said conditioning means and into the working reaches of said conveyors.

References Cited

UNITED STATES PATENTS

| | | | |
|---|---|---|---|
| 3,159,277 | 12/1964 | Carlson et al. | 198—165 X |
| 3,253,389 | 5/1966 | Miller et al. | 53—374 |
| 3,376,969 | 4/1968 | Baker et al. | 198—165 X |

TRAVIS S. McGEHEE, Primary Examiner

U.S. Cl. X.R.

53—387; 198—165

UNITED STATES PATENT OFFICE
CERTIFICATE OF CORRECTION

Patent No. 3,533,217                                    October 13, 1970

Bayard I. Barnes

It is certified that error appears in the above identified patent and that said Letters Patent are hereby corrected as shown below:

Column 5, line 63, "presser" should read -- feeder --.

Signed and sealed this 6th day of April 1971.

(SEAL)
Attest:

EDWARD M. FLETCHER, JR.                      WILLIAM E. SCHUYLER, JR.
Attesting Officer                              Commissioner of Patents